Patented May 26, 1942

2,284,432

UNITED STATES PATENT OFFICE 2,284,432

PLASTIC

James A. Kennedy, Los Angeles, Calif.

No Drawing. Application June 5, 1940, Serial No. 338,933

4 Claims. (Cl. 260—765)

My invention relates to a thermo-plastic intended for use in filling cracks, fissures and dents such as occur in wood, stone, cement, rubber or metal.

It is an object of this invention to provide a thermo-plastic which can be easily applied by means of a heated metal tool such as a soldering iron and which will adhere firmly to metal, wood, rubber, stone or cement, while in its heated plastic condition. On cooling to normal temperature it will harden without cracking or peeling from the surface to which it is applied and which may be easily sanded so as to prepare it for a surface finish of paint, enamel or varnish.

With the above and other objects in view which will appear as the description proceeds, my invention consists of the composition of matter hereinafter described and claimed.

The following example states the ingredients with their optimum proportions:

35½ pounds of sulphur
4 pounds of aluminum stearate
7½ pounds of powdered silica
2 pounds of lamp black
5 pounds 2 ounces of wood flour
1 pound 6 ounces of sugar
11 ounces of asphaltum
2 pounds 13 ounces of rubber
1 pint paraffin oil The plastic composition is compounded as follows: the sulphur is melted to 425° F. It should be noted here that this temperature is considerably above the melting point of sulphur but below that at which it takes fire. Then all the other ingredients with the exception of the asphaltum, rubber and paraffin oil are thoroughly mixed together in the dry state and added to the molten sulphur and the mixture is held under agitation for about an hour at the temperature of 425° F. Then the asphaltum is added thereto and finally the rubber, which is first dissolved in a suitable solvent such as benzine or naphtha. The temperature of the mixture will distill off the solvent of the rubber solution and the paraffin oil is now added and the mixture is agitated at a temperature of about 400° F. for two or three hours to form a homogeneous mass. Then the temperature is dropped to 250° F. and then raised again to 300° F. and poured into suitable molds to form bricks of suitable size. When cool the resulting product is a dry black brick which is now ready for use for filling cracks, fissures and dents with a suitable tool such as a soldering iron which is heated to a temperature of say, 350° F. The heat of the soldering iron will render soft and plastic a portion adjacent thereto and will adhere to the soldering iron and may be transferred like solder to the place where it is to be applied. If a crack is to be filled, the soft plastic is worked into it and then smoothed over with the soldering iron and when cold may be machined or sanded in the usual manner and is now ready for a finishing coat of paint, enamel or varnish.

The function of the sulphur is to provide the base of the plastic and its low melting point. The aluminum stearate acts as a binder or carrier of the other ingredients and to produce a fine grain plastic. The wood flour and silica are fillers. The sugar imparts a greater resistance to the plastic against acetone, gasoline and other solvents while the asphaltum and the rubber impart to the plastic its adhesive qualities. The lamp black is pigment that may be omitted or another pigment may be substituted therefor. The paraffin oil increases the plasticity of the compound but may be omitted.

While the example quoted states the preferred proportions of the ingredients it will be understood by those skilled in the art that they may be varied within reasonable limits and yet produce a thermo-plastic giving good results. For instance, the sulphur may be varied from 25 to 45 pounds, aluminum stearate from 2 to 6 pounds, silica from 5 to 9 pounds, wood flour from 3 to 7 pounds, sugar from 1 to 2 pounds and the rubber from 1 to 4 pounds.

I claim:

1. A thermo-plastic of the character described comprising:

35½ pounds sulphur,
4 pounds aluminum stearate,
7½ pounds powdered silica,
2 pounds lamp black,
5 pounds 2 ounces wood flour,
1 pound 6 ounces sugar,
11 ounces of asphaltum,
2 pounds 13 ounces rubber, and
1 pint paraffin oil.

2. A thermo-plastic of the character described comprising the following ingredients in the proportions stated:

| Ingredient | | Amount |
|---|---|---|
| Sulphur | parts | 25–45 |
| Aluminum stearate | do | 2–6 |
| Powdered silica | do | 5–9 |
| Wood flour | do | 3–7 |
| Sugar | do | 1–2 |
| Rubber | do | 1–4 |

3. A thermo-plastic of the character described comprising the following ingredients in the proportions stated:

| | | |
|---|---|---|
| Sulphur | parts | 25-45 |
| Aluminum stearate | do | 2-6 |
| Powdered silica | do | 5-9 |
| Wood flour | do | 3-7 |
| Sugar | do | 1-2 |
| Rubber | do | 1-4 |
| Pigment | pounds | 2 |

4. A thermo-plastic of the character described comprising the following ingredients in the proportions stated:

| | | |
|---|---|---|
| Sulphur | parts | 25-45 |
| Aluminum stearate | do | 2-6 |
| Powdered silica | do | 5-9 |
| Wood flour | do | 3-7 |
| Sugar | do | 1-2 |
| Rubber | do | 1-4 |
| Pigment | pounds | 2 |
| Paraffin oil | pint | 1 |

JAMES A. KENNEDY.